Oct. 17, 1967  J. D. CARLSTROM  3,347,598
MEANS FOR VARYING WHEEL SPACING
Filed Dec. 23, 1965  3 Sheets-Sheet 1

INVENTOR.
JOHN D. CARLSTROM
BY
Tweedale & Gerhardt
ATTORNEYS.

United States Patent Office  3,347,598
Patented Oct. 17, 1967

3,347,598
MEANS FOR VARYING WHEEL SPACING
John D. Carlstrom, Detroit, Mich., assignor to Massey-Ferguson Inc., Detroit, Mich.
Filed Dec. 23, 1965, Ser. No. 515,884
1 Claim. (Cl. 301—9)

ABSTRACT OF THE DISCLOSURE

Wheel spacing means for shifting the wheels of a tractor or the like inwardly or outwardly on the supporting axle to allow changing the axial distance between the wheels to a considerable extent.

---

Figure 1:
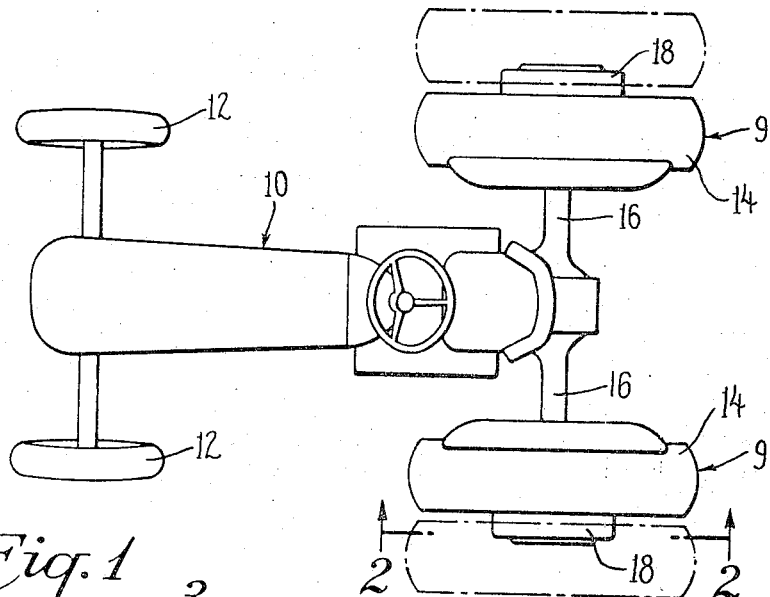

In the use of tractors it is often desirable to adapt the wheel spacing to the different widths between the rows of crops. Many forms of pushing and pulling devices have been devised for this general purpose. The principle of adjustment used in connection with this invention is disclosed in the U.S. patent to Strehlow 2,417,139.

It has been found that most of the conventional wheel spacing assemblies either do not have a sufficiently wide shifting range, are too cumbersome in structure or require too many adjustment steps.

The invention therefore consists in a wheel spacing device for the driven wheels of, in particular, agricultural tractors which allow changing of the distance between the wheels in a range limited by a very narrow and a very wide position and afford a favorable weight distribution while employing compact and easy-to-control means to achieve said purposes. These means are provided on the outside periphery of an inner wheel portion of substantial width and on the inside periphery of an outer wheel portion surrounding said inner wheel portion. The means which are adapted to cooperate with each other comprise a plurality of helical track rails equally distributed circumferentially on the inside of the outer wheel portion and a number of shoes, corresponding to the number of rails, on the outside of the inner wheel portion. Each shoe has a groove for interengagement with an appertaining rail. The shoes are attached either to one set of pads provided on one side of the inner wheel portion or to another set of pads provided at the other side of the inner wheel portion and are adapted to be engaged slidingly with the rails for movement thereon, thus allowing relative displacement between the inner and outer wheel portions; or to be engaged firmly, thus allowing frictional interconnection for driving the entire wheel without relative displacement between the inner and outer wheel portions.

The adjustment range is determined by the positioning of the end portions of the helical track. These end portions coincide by necessity substantially with the inside and the outside of the rim which constitutes the inner periphery of the outer wheel portion.

In order to attain a still wider adjustment range the shoes must be reversed or displaced on the inner wheel portion. Such displacing of the rollers gives an added adjustment distance in the direction and to the extent of the displacement.

As the spacing range afforded by the spiral track rails is not sufficient for many agricultural purposes, the feature allowing extra adjustment is of considerable importance.

Consequently, this invention is directed to improved structure which allows wheel spacing to a greater extent than the spacing which can be achieved with an assembly of parallel, helical track rails on the outer wheel portion in cooperation with shoes on the inner wheel portion.

Figure 2:
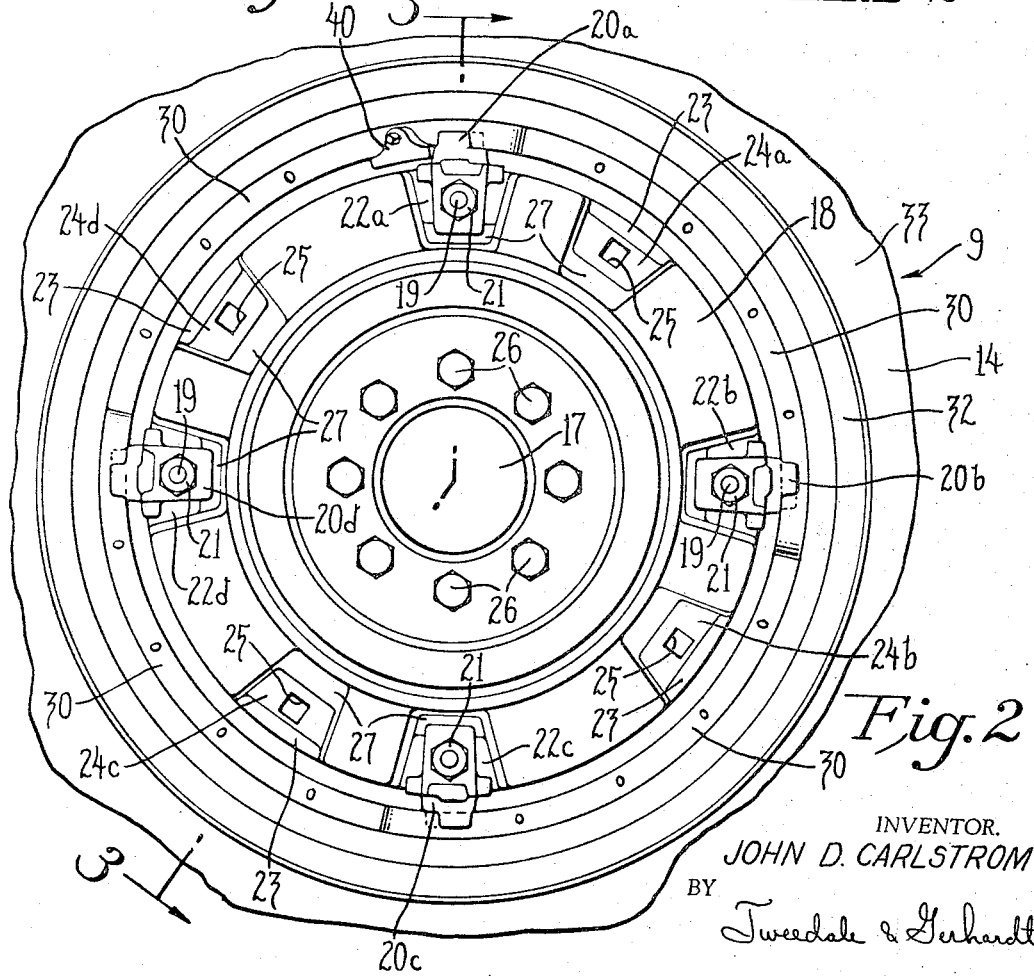
Figure 3:
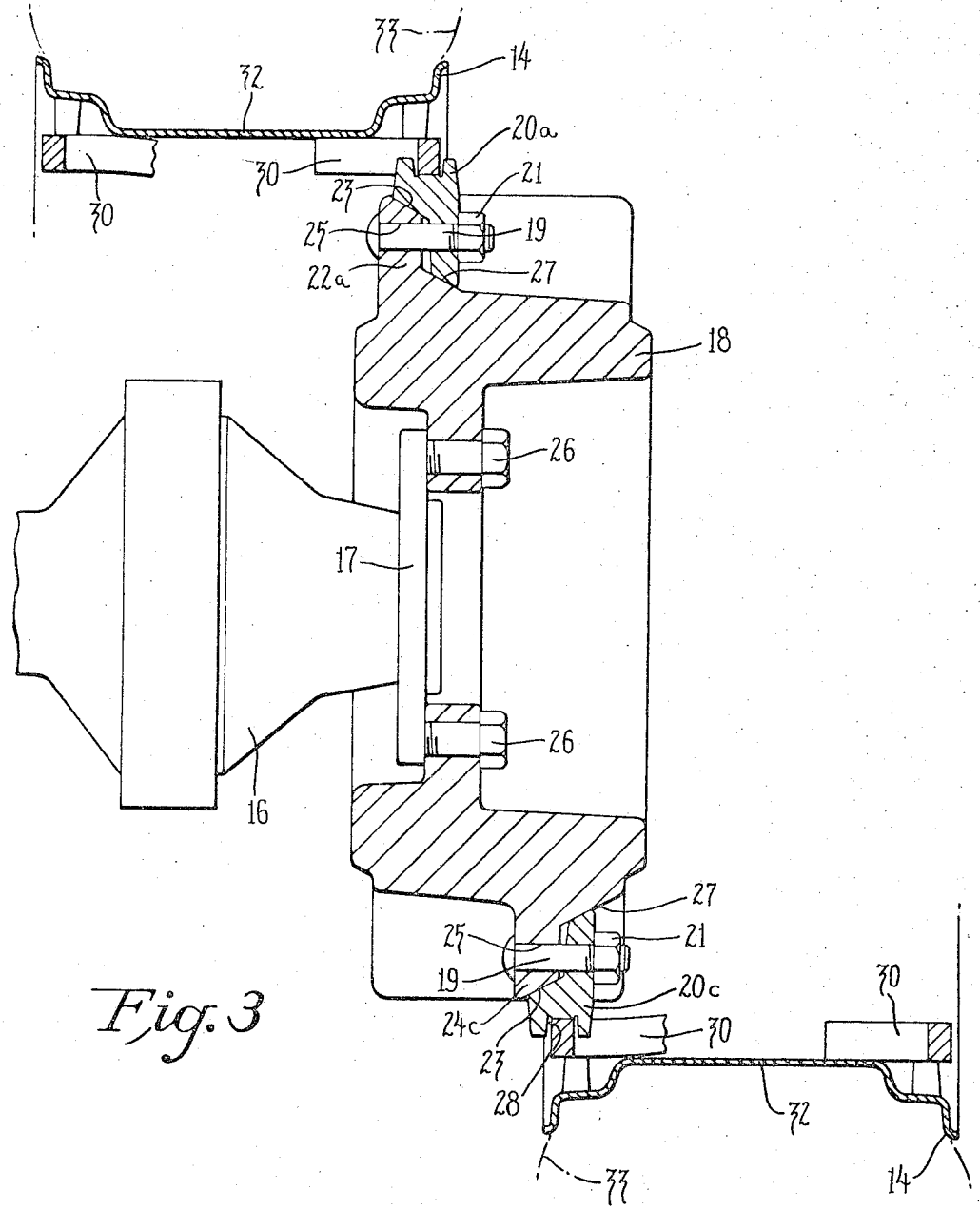
Figure 4:
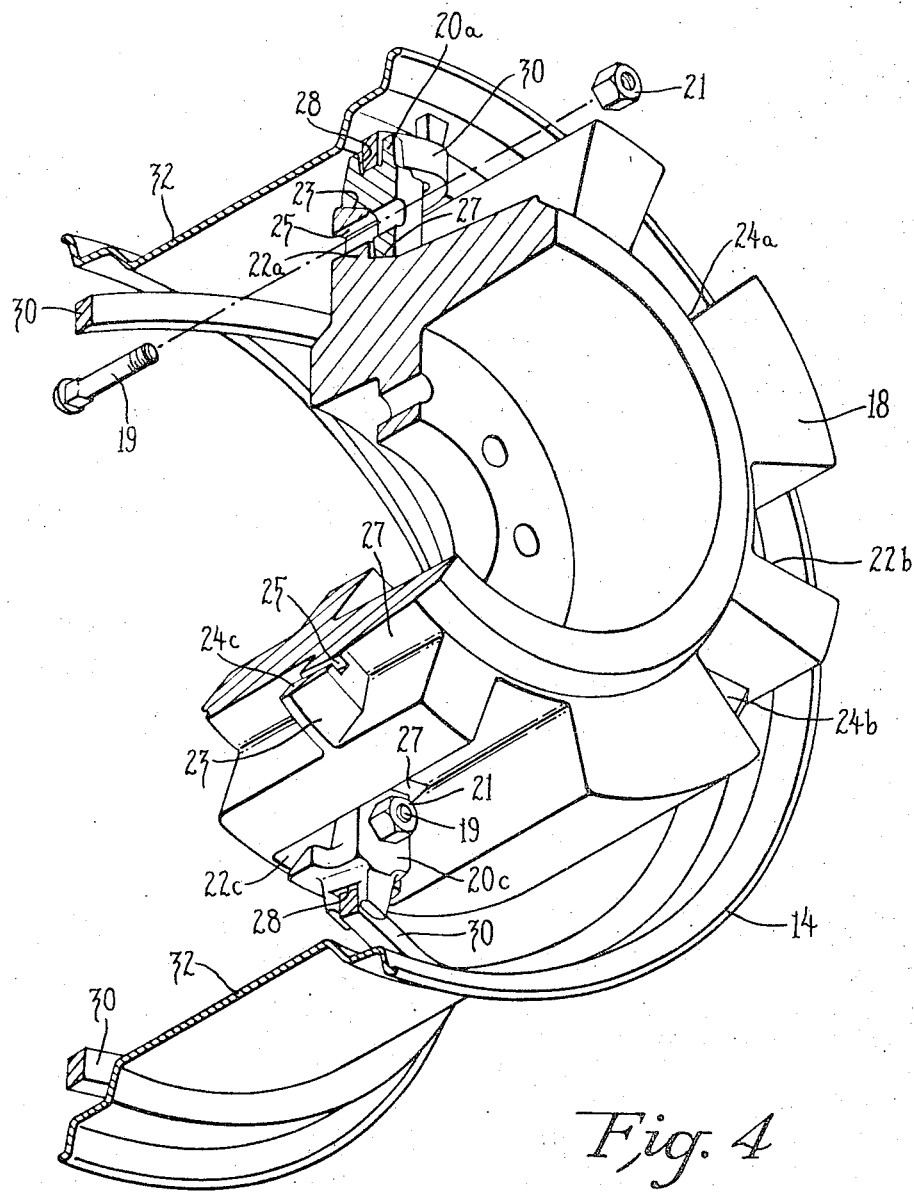

An embodiment of the invention will now be described by way of example with reference to the accompanying drawings, in which:

FIG. 1 is a plan view of a tractor illustrating the two extreme spacing positions of the driven wheels,
FIG. 2 is a sectional view taken on line 2—2 of FIG. 1,
FIG. 3 is a sectional view taken on line 3—3 of FIG. 2, and
FIG. 4 is a perspective view of the inner portion of a tractor wheel with parts broken away for clarity.

FIG. 1 shows a tractor 10 which is supported on front wheels 12 and rear wheels 9. The rear wheels 9 are composed of the outer wheel portions or tire and rim assemblies 14 and the inner wheel portions 18 which are journalled by the rear axle 16. The steerable front wheels 12 are disposed at a suitable width, preferably rather close together.

As illustrated in FIGS. 2 and 3 the inner wheel portion 18 is mounted by bolts 26 on the mounting 17 which is non-rotatably carried on the axle 16. The inner wheel portion 18 is a cast part of substantial width and strength which has two sets of pads 22a, b, c, d and 24a, b, c, d. As best shown in FIG. 3 the pads 22a, b, c, d are disposed at the inside of the wide inner wheel portion 18 whereas the pads 24a, b, c, d are disposed at the outside of the inner wheel portion 18. All pads 22, 24 are disposed on the periphery of the inner wheel portion 18 without laterally protruding therefrom and have inclined shoulders 23, 27 for engagement with similarly inclined surfaces on shoes 20, which shoes can be attached to the pads through holes 25 by means of bolts 19 and nuts 21. The camming action of the matching inclined surfaces on the shoes in cooperation with the inclined pad shoulders 23, 27 upon screw-fastening of the shoes causes the shoes to be pressed into engagement with the outer wheel portion 14.

The inner wheel portion 18 is recessed where the pads are provided so as to allow easy access to the pad and shoe assemblies for detachment or mounting of the shoes.

Each shoe 20 has a radially outwardly disposed groove 28. The tighter the bolts and nuts 19, 21 are fastened, the farther outwardly move the shoes 20 as a result of the matching, interengaging inclined surfaces on the shoes and the pads.

Each tire and rim assembly 14 has a rim 32 and tire 33 mounted thereon. The rim 32 is provided at its inner periphery with a plurality of parallel, helical track rails 30 which are equally distributed circumferentially of the rim 32 and firmly secured thereto, as by riveting or welding.

In one mode of interconnecting the inner wheel portion 18 with the outer wheel portion 14 of each rear wheel 9 the shoes 20 are screw-fastened in the inner pads 22 so as to firmly engage the outer wheel portion 14 by frictional interengagement between the grooves 28 and the rails 30. The necessary engagement pressure is exerted on account of the inclined shoulders 23, 27 on the wheel portion 18 in cooperation with the matching inclined surfaces on the shoes 20 upon screw-fastening of the shoes to the pads.

After loosening the screw connection 19, 21 between the pads and the shoes, it is possible by rotating one of the two inner wheel portions 18 at a time to achieve displacement between the inner wheel portion 18 and the outer wheel portion 14. Upon either using a forward or reverse gear to rotate the inner wheel portion 18, the shoes 20 can slide along the spiral track rail 30 in one or the other direction, thereby pushing the outer wheel portion 14 axially outwardly or inwardly, respectively.

A stop 40 (FIG. 2) can be provided on one of the rails. By suitably presetting it, the distance of travel of the shoes along the rails can be determined. As soon as the operator notices that a shoe hits the stop 40, he knows that the desired displacement has been reached.

As it is an object of the present invention to provide for an additional adjustment range, the second set of pads 24a, b, c, d is disposed at the outside of the wide inner wheel portion 18. The two sets of pads are in staggered relationship to each other so that the juxtaposed pads 22a and 24a, 22b and 24b, 22c and 24c as well as 22d and 24d, respectively, following their mutual arrangement the helical pitch of the rails 30. If the shoes 20 are changed from the inner pads 22 to the outer pads 24 the adjustment range is outwardly extended by the distance between the two sets of pads. Conversely, if the shoes 20 are changed from the outer pads 24 to the inner pads 22 the adjustment range is extended inwardly by the distance between the two sets of pads.

In order to change the shoes from one set of pads to the other one, the tractor is moved so as to place a pad and shoe assembly in the uppermost position. This assembly is then free of any pressure. By removing the bolt 19 and nut 21, the uppermost shoe 20 is taken out and fixed onto the adjacent outer pad by inserting the bolt 19 in the hole 25. For example, if the shoe 20a is removed from the inner pad 22a, it is then placed on the adjacent outer pad 24a. This process is being continued by successively moving all pad and shoe assemblies into their uppermost positions and changing them from the inside pad to the adjacent outside pad. After all four shoes have been changed, the adjustment range has been shifted outwardly as a result of the replacement of each shoe on its appertaining rail.

From the foregoing description of the construction and operation of the wheel spacing means it will be readily apparent that compact, reliable and easily operable means have been provided for extending the adjustment range. In particular, the cast inner wheel portion 18 with the two sets of inner and outer pads 22, 24 affords reliable supporting means which in both the inner and the outer position are placed fully under the rim of the wheel thus creating extreme stability in both positions. Further the wedging action between the pads 22a, b, c, d or 24a, b, c, d, respectively, and the shoes 20a, b, c, d caused by the matching inclined surfaces on said parts upon screw-fastening of the shoes to the pads facilitates firm interengagement between the inner and outer wheel parts in a most convenient and reliable manner.

I claim:

In a wheel spacing means including an axle, an inner wheel portion of substantial width mounted on said axle, an outer wheel portion surrounding said inner wheel portion, said outer wheel portion being comprised of a rim, and a plurality of parallel helical track rails equally distributed circumferentialy on the inside of said rim; the combination comprising two axially spaced sets of pads at the inside and at the outside of the periphery of said inner wheel portion without laterally protruding therefrom, said pads having inclined surfaces, and with the distance between said two sets of pads corresponding to the distance between the helical track rails on the rim; and a plurality of shoes adapted to be screw-fastened to said pads, said shoes having inclined surfaces matching the inclined surfaces on said pads and a peripheral groove each, said grooves being adapted for engagement with said rails, whereby the matching surfaces on the pads and the shoes allow sliding engagement between the grooves and the rails for spacing the outer wheel portion as well as firm engagement for driving.

References Cited

UNITED STATES PATENTS

| 2,417,139 | 3/1947  | Strehlow | 301—9 X |
| 2,580,481 | 1/1952  | Strehlow. | |
| 2,793,913 | 5/1957  | Stough   | 301—9 |
| 2,963,317 | 12/1960 | Stough   | 301—9 |
| 3,048,443 | 3/1962  | O'Donnell | 301—9 |

FOREIGN PATENTS 1,332,133  6/1963  France.

RICHARD J. JOHNSON, *Primary Examiner.*